(12) United States Patent
Takita (10) Patent No.: US 8,736,748 B2
(45) Date of Patent: May 27, 2014

(54) IMAGE CAPTURING APPARATUS AND CONTROL METHOD CONTROLLING EXPOSURE TIME OF IMAGE SENSOR

(75) Inventor: Taro Takita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/366,504

(22) Filed: Feb. 6, 2012

(65) Prior Publication Data
US 2012/0212663 A1 Aug. 23, 2012

(30) Foreign Application Priority Data
Feb. 21, 2011 (JP) .................................. 2011-035175

(51) Int. Cl.
| H04N 5/235 | (2006.01) |
| G03B 7/00 | (2014.01) |
| H04N 5/238 | (2006.01) |
| H04N 5/228 | (2006.01) |

(52) U.S. Cl.
USPC ...... 348/362; 348/364; 348/363; 348/221.11; 348/222.1

(58) Field of Classification Search
CPC ....... H04N 5/765; H04N 5/772; H04N 5/783; H04N 7/01; H04N 5/91; H04N 5/232; H04N 5/238; H04N 5/243; H04N 3/1562; H04N 5/23245
USPC ........ 348/221.1, 222.1, 229.1, 234, 235, 362, 348/363, 364, 366
See application file for complete search history.

(56) References Cited

U.S. PATENT DOCUMENTS

| 5,196,938 A | * | 3/1993 | Blessinger ...................... 348/22 |
| 2005/0052553 A1 | * | 3/2005 | Kido et al. ..................... 348/296 |
| 2008/0297613 A1 | * | 12/2008 | Takahashi et al. .......... 348/221.1 |
| 2009/0022408 A1 | * | 1/2009 | Hizume et al. ................ 382/236 |
| 2010/0171844 A1 | * | 7/2010 | Okamoto et al. ........... 348/229.1 |
| 2010/0214439 A1 | * | 8/2010 | Oshima et al. .............. 348/229.1 |
| 2010/0259627 A1 | * | 10/2010 | Trumbull et al. ........... 348/208.4 |

FOREIGN PATENT DOCUMENTS

JP 2007-195038 8/2007

* cited by examiner

Primary Examiner — Twyler Haskins
Assistant Examiner — Padma Haliyur
(74) Attorney, Agent, or Firm — Cowan, Liebowitz & Latman, P.C.

(57) ABSTRACT

There is provided an image capturing apparatus, comprising an image capturing unit configured to acquire video data at a first frame rate or a second frame rate higher than the first frame rate; and a control unit configured to perform control of an aperture and an exposure time within a range in which the exposure time is shorter than or equal to a maximum exposure time that is a reciprocal of a frame rate of the image capturing unit, so that luminance of the image signal acquired by the image capturing unit is at a predetermined level, wherein when the image capturing unit is operating at the first frame rate, the control unit performs the control within a range in which the exposure time is shorter than a first time that is a reciprocal of the first frame rate.

12 Claims, 8 Drawing Sheets

IMAGE CAPTURING APPARATUS AND CONTROL METHOD CONTROLLING EXPOSURE TIME OF IMAGE SENSOR

BACKGROUND OF THE INVENTION

1. Field of the Invention

The present invention relates to an image capturing apparatus and a control method therefor.

2. Description of the Related Art

Image capturing apparatuses such as video cameras include those that can change the frame rate when capturing images of subjects (hereinafter referred to as the "image-capturing frame rate"). Using such an image capturing apparatus, video data that has been captured and recorded at an image-capturing frame rate (e.g., 240 fps) higher than a normal image-capturing frame rate (e.g., 60 fps) can be reproduced at the normal frame rate. Such reproduction makes it possible to obtain slow playback video in which a subject motion is slower than actual motion.

The frame rate of a liquid crystal display of such an image capturing apparatus is generally equivalent to the normal image-capturing frame rate (e.g., 60 fps). Thus, in the case where the liquid crystal display is used as an electronic viewfinder (EVF) while video is being captured at a high image-capturing frame rate, the image capturing apparatus converts the frame rate of the video into the frame rate of the liquid crystal display by thinning out frame images for display.

Examples of the time when the image-capturing frame rate changes from "Normal" to "High Speed" include the following two cases. The first case is the time when video recording is started. For example, consider the case where the image capturing apparatus is set in the mode of performing recording at a high image-capturing frame rate. Even in such a case, before the start of the recording, the image capturing apparatus generally performs image capturing and display on the liquid crystal display at the normal frame rate for the purpose of, for example, reducing power consumption. For this reason, the image-capturing frame rate changes from "Normal" to "High Speed" at the time when recording is started. The second case is the time when the image-capturing frame rate is switched during video recording. For example, some image capturing apparatuses include an operation unit such as a "high-speed recording start button". By pressing the "high-speed recording start button" in scenes for which slow playback is desired while video is being recorded at the normal image-capturing frame rate, a user can capture and record only some of the scenes at a high image-capturing frame rate.

Incidentally, in the case of video capturing, the exposure time of an image sensing element needs to be shorter than the interval between frames (which is the reciprocal of the image-capturing frame rate). For this reason, when the image-capturing frame rate changes from "Normal" to "High Speed", video may be darkened as a result of the shortened exposure time. In view of this, a technique has been proposed in which the brightness of images is maintained at a predetermined level when the image-capturing frame rate has been changed (Japanese Patent Laid-Open No. 2007-195038). According to Japanese Patent Laid-Open No. 2007-195038, when the image capturing frame rate is increased, the aperture and the gain of image signals are adjusted so as to cancel out a change in the exposure time.

However, a certain amount of time is required for the aperture to be changed into the target state. For this reason, video is temporarily darkened and image quality decreases during the period until the aperture has completely changed. Furthermore, an increase in gain results in an increase in noise and degradation in image quality.

SUMMARY OF THE INVENTION

The present invention has been achieved in light of such circumstances, and provides a technique for suppressing degradation in image quality when changing the image-capturing frame rate of video.

According to a first aspect of the present invention, there is provided an image capturing apparatus, comprising: an image capturing unit configured to acquire video data by reading out an image signal from an image sensing element at a first frame rate or a second frame rate higher than the first frame rate, the image sensing element generating the image signal by photoelectric conversion of light incident from an optical system including an aperture; and a control unit configured to perform control of the aperture and an exposure time of the image sensing element within a range in which the exposure time is shorter than or equal to a maximum exposure time that is a reciprocal of a frame rate of the image capturing unit, so that luminance of the image signal acquired by the image capturing unit is at a predetermined level, wherein when the image capturing unit is operating at the first frame rate, the control unit performs the control within a range in which the exposure time is shorter than a first time that is a reciprocal of the first frame rate.

According to a second aspect of the present invention, there is provided an image capturing apparatus, comprising: an image capturing unit configured to acquire video data by reading out an image signal from an image sensing element at a first frame rate or a second frame rate higher than the first frame rate, the image sensing element generating the image signal by photoelectric conversion of light incident from an optical system including an aperture; a control unit configured to perform control of the aperture and an exposure time of the image sensing element within a range in which the exposure time is shorter than or equal to a maximum exposure time that is a reciprocal of a frame rate of the image capturing unit, so that luminance of the image signal acquired by the image capturing unit is at a predetermined level; and a reception unit configured to receive a switching instruction to switch the frame rate of the image capturing unit from the first frame rate to the second frame rate, wherein in a case where the switching instruction is received when the exposure time is longer than a maximum exposure time corresponding to the second frame rate, the control unit performs control for opening the aperture so as to compensate for a drop in the luminance of the image signal as a result of shortening the exposure time to the maximum exposure time corresponding to the second frame rate, and also performs control for switching the frame rate of the image capturing unit from the first frame rate to the second frame rate, and in the switching control, the control unit gradually changes the frame rate of the image capturing unit from the first frame rate to the second frame rate while the aperture is being gradually opened by the opening control.

According to a third aspect of the present invention, there is provided a control method for an image capturing apparatus, comprising: an image capturing step of acquiring video data by reading out an image signal from an image sensing element at a first frame rate or a second frame rate higher than the first frame rate, the image sensing element generating the image signal by photoelectric conversion of light incident from an optical system including an aperture; and a control step of performing control of the aperture and an exposure time of the image sensing element within a range in which the exposure time is shorter than or equal to a maximum exposure time that is a reciprocal of a frame rate in the image capturing step, so that luminance of the image signal acquired in the image capturing step is at a predetermined level, wherein in a case where the image capturing step is being executed at the first frame rate, in the control step, the control is performed within a range in which the exposure time is shorter than a first time that is a reciprocal of the first frame rate.

According to a fourth aspect of the present invention, there is provided a control method for an image capturing apparatus, comprising the steps of: an image capturing step of acquiring video data by reading out an image signal from an image sensing element at a first frame rate or a second frame rate higher than the first frame rate, the image sensing element generating the image signal by photoelectric conversion of light incident from an optical system including an aperture; a control step of performing control of the aperture and an exposure time of the image sensing element within a range in which the exposure time is shorter than or equal to a maximum exposure time that is a reciprocal of a frame rate in the image capturing step, so that luminance of the image signal acquired in the image capturing step is at a predetermined level; and a reception step of receiving a switching instruction to switch the frame rate in the image capturing step from the first frame rate to the second frame rate, wherein in a case where the switching instruction is received when the exposure time is longer than a maximum exposure time corresponding to the second frame rate, in the control step, control is performed for opening the aperture so as to compensate for a drop in the luminance of the image signal as a result of shortening the exposure time to the maximum exposure time corresponding to the second frame rate, and control is also performed for switching the frame rate in the image capturing step from the first frame rate to the second frame rate, and in the switching control in the control step, the frame rate of the image capturing step is gradually changed from the first frame rate to the second frame rate while the aperture is being gradually opened by the opening control.

With the above-described configuration, the present invention enables suppression of degradation in image quality when changing the image-capturing frame rate of video.

Further features of the present invention will become apparent from the following description of exemplary embodiments with reference to the attached drawings.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

In the following embodiments, a digital video camera (DVC) will be described as an example of an image capturing apparatus of the present invention. The image capturing apparatus of the present invention is, however, not limited to the DVC, and may for example be a personal computer (PC) or mobile phone that is provided with a camera capable of capturing video. Also, some constituent elements for image capturing (e.g., lenses) may be provided outside the image capturing apparatus of the present invention.

Figure 1:
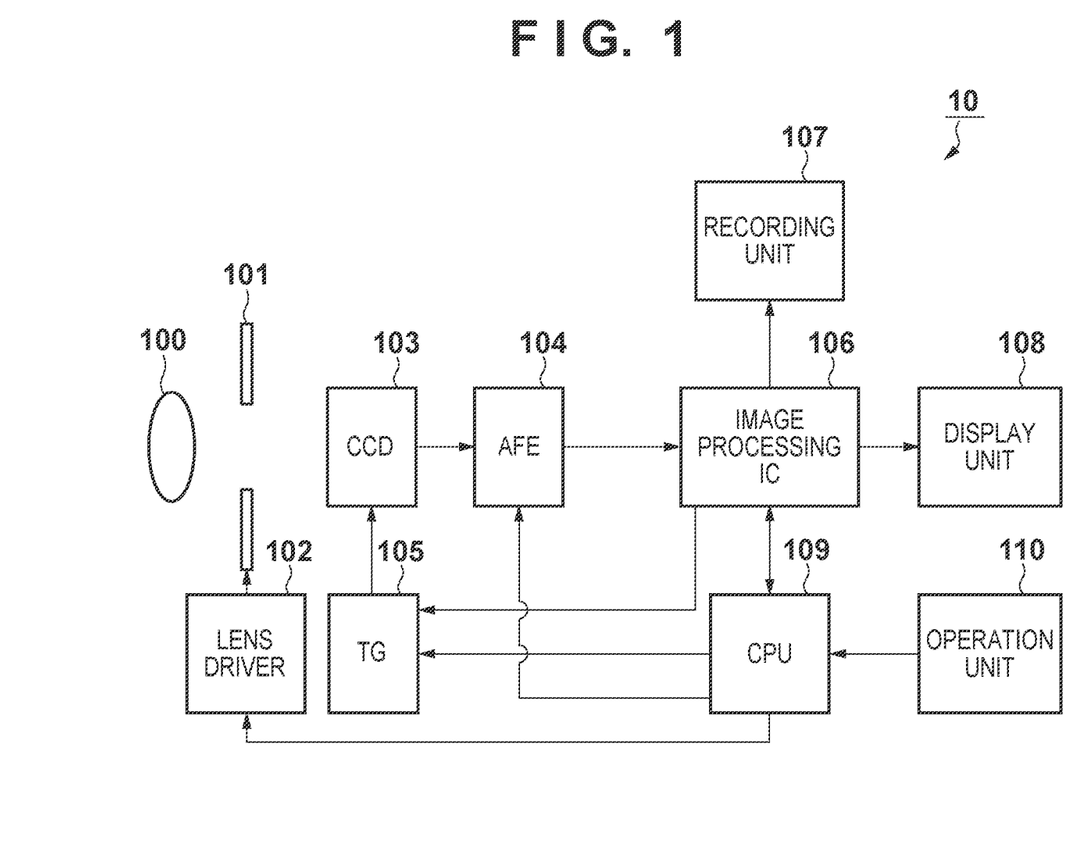
FIG. 1 is a block diagram showing the configuration of a DVC 10 according to embodiments of the present invention.

FIG. 1 is a block diagram showing the configuration of the DVC 10 according to the embodiments. In FIG. 1, a lens group 100 includes a focusing lens and a zoom lens, and also includes an AF mechanism for auto focusing (AF). An aperture 101 adjusts the amount of incident light. The lens group 100 and the aperture 101 constitute an optical system. A lens driver 102 drives the focusing lens and the zoom lens included in the lens group 100 and the aperture 101 under the control of a CPU 109 described later. A CCD 103 generates electric signals (image signals) by photoelectric conversion of light incident from the optical system. The CCD 103 is controlled by a timing generator (TG) 105 and is capable of controlling the exposure time by sweeping out the electric charge of a photodiode in accordance with an electronic shutter pulse received from the TG 105. Note that the image sensing element may also be a CMOS or the like, instead of the CCD 103.

An AFE 104 includes a correlated double sampling (CDS) circuit, an AGC circuit, and an A/D converter and generates digital image data based on analog image signals output from the CCD 103. Under the control of the CPU 109 described later, the TG 105 outputs a vertical transfer pulse and a horizontal transfer pulse for driving the CCD 103 based on a vertical synchronization signal and a horizontal synchronization signal received from an image processing IC 106, and also outputs an electronic shutter pulse for sweeping out the electric charge.

The image processing IC 106 performs image processing regarding γ, aperture, color balance, and the like on the digital image data output from the AFE 104. The image processing IC 106 acquires video data by converting a plurality of such image-processed image data pieces into the desired moving image format. The image processing IC 106 further outputs the vertical synchronization signal and the horizontal synchronization signal to the TG 105 at appropriate times so that image signals are read out at a predetermined frame rate from the CCD 103. In the embodiments of the present invention, the image processing IC 106 is capable of operating so as to read out image signals at either a normal frame rate (first frame rate) or a high frame rate (second frame rate). The image processing IC 106 is also capable of using a frame rate between the normal frame rate and the high frame rate as necessary. Hereinafter, a recording mode using the normal frame rate and a recording mode using the high frame rate are also respectively referred to as a "normal recording mode" and a "high-speed recording mode". The AFE 104 and the image processing IC 106 constitute an image capturing unit.

A recording unit 107 includes an SD card, a flash memory, or the like for recording video data in a moving image format such as MPEG. A display unit 108 displays video data or the like acquired by the image processing IC 106. The CPU 109 controls the lens driver 102 and the TG 105 as mentioned above and also performs overall control of the DVC 10. An operation unit 110 includes a recording start button and a high-speed recording start button. When the high-speed recording start button is pressed, the CPU 109 receives a switching instruction to switch the frame rate from "Normal" to "High Speed". A user can also set a value for the "high frame rate" by operating a menu screen or the like displayed in the display unit 108 through the operation unit 110.

Next, an image capturing operation performed by the DVC 10 will be described in detail. In the case of the normal recording mode, it is assumed that the image-capturing frame rate is 60 fps. In this case, the recording unit 107 records a single frame of image data per $\frac{1}{60}$ seconds.

First, the CPU 109 performs register setting necessary for readout from CCD 103 for the TG 105, the setting involving setting the timing of a V pulse (described later), setting the timing of an electronic shutter pulse, and setting the timing of an H pulse (described later) for sensor readout. The V pulse is a pulse signal for moving the electric charge accumulated in a photodiode (not shown) of the CCD 103 to a vertical transfer unit (not shown) per vertical synchronization time (frame time of $\frac{1}{60}$ seconds) and transferring the electric charge from the vertical transfer unit to a horizontal transfer unit (not shown) per horizontal synchronization time at any given time. The V pulse is output from the TG 105 to the CCD 103. The H pulse is a pulse signal for mainly outputting the electric charge transferred to the horizontal transfer unit, to the AFE 104 one pixel at a time. The H pulse is output from the TG 105 to the CCD 103.

The electronic shutter pulse is a signal for controlling the exposure time of the CCD 103. When the electronic shutter pulse is output to the CCD 103, the electric charge accumulated in the photodiode is swept out. The period of time from after the sweeping out of the electric charge to the time when the electric charge subsequently accumulated is transferred to the vertical transfer unit is the exposure time of the CCD 103. Note that the electronic shutter pulse is responsible for part of AE control in which the luminance of image signals read out from the CCD 103 is controlled at a predetermined (appropriate) level.

The CPU 109 further performs A/D conversion timing setting, gain setting, and the like for the AFE 104.

When the above initial settings have ended, a control signal is output from the TG 105 to the CCD 103 and readout of image signals is started.

The image processing IC 106 outputs the vertical synchronization signal (hereinafter referred to as the "VD signal") to the TG 105, and the TG 105 outputs the V pulse to the CCD 103 on the basis of the VD signal. Incident light passing through the lens group 100 and the aperture 101 exposes the CCD 103 during the exposure time that is determined by the timing of the electronic shutter pulse set in the TG 105.

Figure 2:
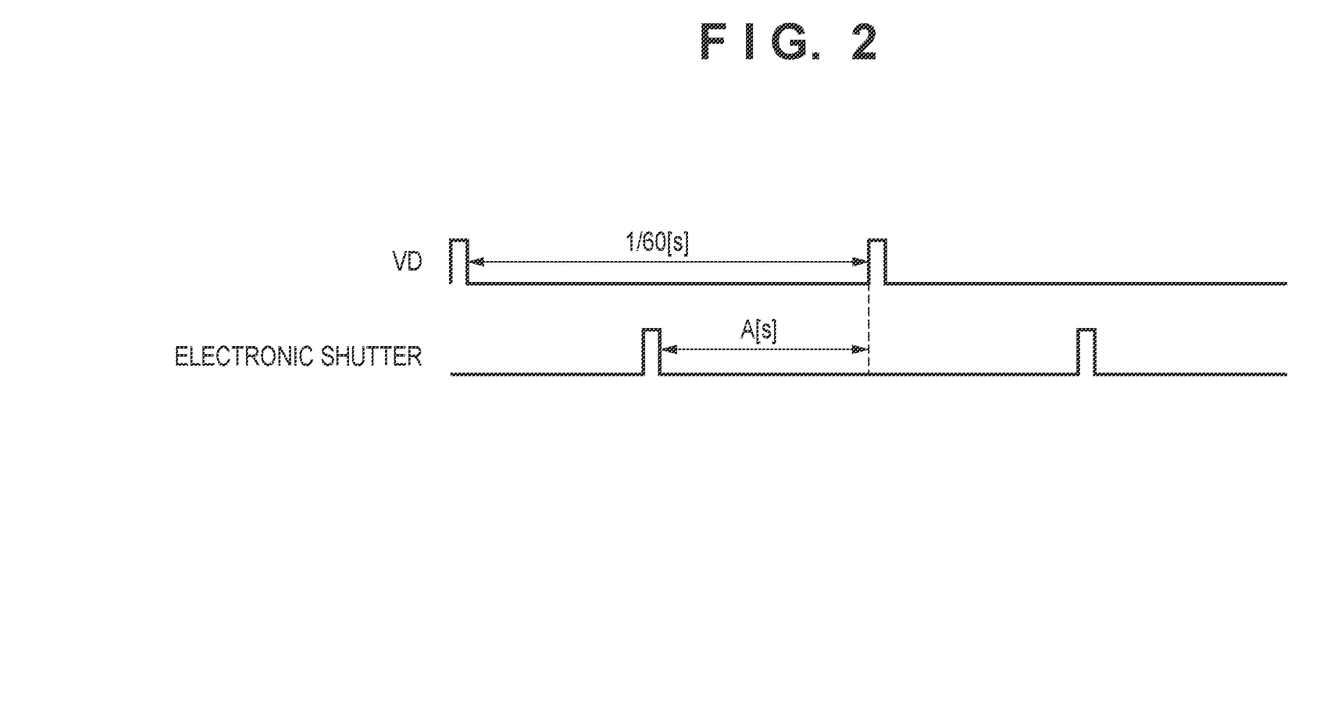
FIG. 2 is a timing chart of a vertical synchronization signal (VD signal) and an electronic shutter pulse.

FIG. 2 shows a timing chart of the vertical synchronization signal (VD signal) and the electronic shutter pulse. As shown in FIG. 2, when the VD signal is output every $\frac{1}{60}$ seconds, the electric charge in the photodiode of the CCD 103 is transferred to a vertical transfer path. Also, the electronic shutter pulse is output during the interval between VD signals. In the case of FIG. 2, the exposure time is A seconds, and if the electronic shutter pulse is not output, exposure of up to $\frac{1}{60}$ seconds at the maximum is possible. In other words, the interval between VD signals that corresponds to the reciprocal of the image-capturing frame rate is a maximum exposure time.

The image-capturing frame rate can be changed by changing the cycle of VD signals. For example, if the cycle of the VD signals is a $\frac{1}{240}$-second interval, the image-capturing frame rate is 240 fps. In this case, the maximum exposure time is $\frac{1}{240}$ seconds, and the cycle of VD signals is the maximum exposure time.

In accordance with the V pulse and the H pulse output from the TG 105, a single frame of image signals are output to the AFE 104 one pixel at a time. The CDS circuit (not shown) of the AFE 104 detects the luminance level of the image signals, the AGC circuit amplifies the image signals to the desired gain level, and the A/D converter converts the image signals from analog to digital signals (image data) (A/D conversion). The A/D converted image data is transferred to the image processing IC 106, undergoes processing such as white balance adjustment, noise reduction (NR), and contour-enhancement correction, and is displayed in the display unit 108. The image processing IC 106 also detects the luminance level of image data for each frame, and the CPU 109 controls the aperture 101, the electronic shutter implemented by the TG 105, and the gain of amplification by the AFE 104 so that appropriate exposure is achieved for the image data to be acquired.

Next, general exposure control will be described with reference to an AE program diagram in FIG. 3. Note that only the solid line portion (ranges A to D) in FIG. 3 will be described herein, and the dashed dotted line portion (ranges E to G) will be discussed later.

Figure 3:
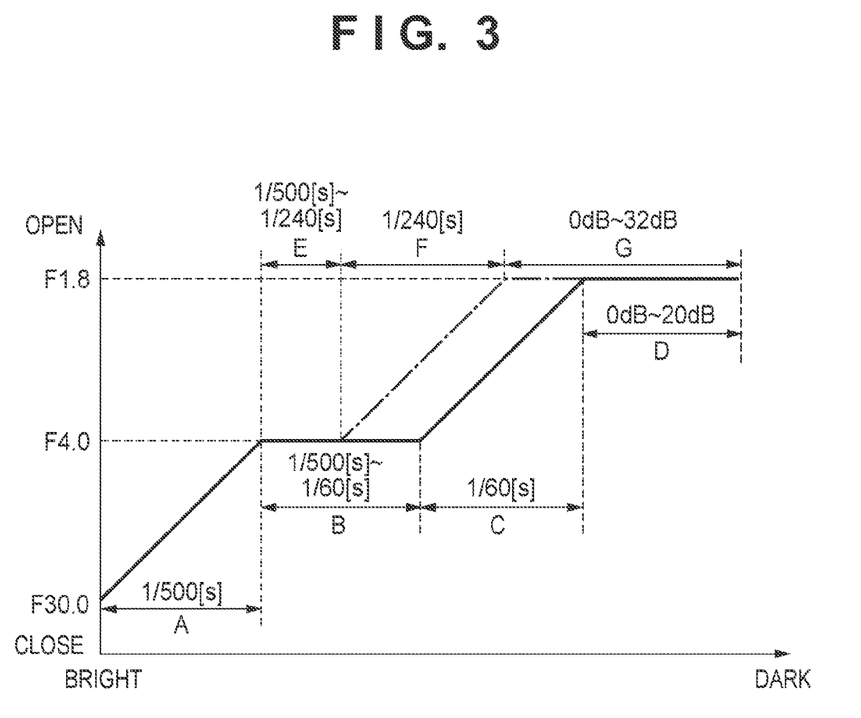
FIG. 3 is a diagram illustrating general exposure control, and exposure control according to a first embodiment.

The AE program diagram in FIG. 3 shows the relationship between the aperture, the exposure time, and the gain during exposure control. In FIG. 3, the horizontal axis indicates the brightness of a subject, and the vertical axis indicates the F number derived from the ratio between the opening diameter of the aperture and the focal length. The F number transitions in the range of approximately 1.8 to 30. The smaller the F number, the greater the amount of exposure of the subject to the CCD 103, whereas the greater the F number, the smaller the exposure amount. The F number will be $\sqrt{2}x$ if the light amount is reduced to a half, and will be $1/\sqrt{2}x$ if the light amount is doubled.

If the subject is extremely bright, the shutter speed is $\frac{1}{500}$ seconds, the gain is 0 dB, and the F number is 30 as shown at the left edge of the range A in FIG. 3. Then, as the subject gets darker, the aperture 101 is gradually opened and the F number becomes 4.0. If the subject gets even darker, as shown in the range B in FIG. 3, the exposure time increases up to the point where the shutter speed is $\frac{1}{60}$ seconds as the subject gets darker, from the state in which the F number is 4.0, the gain is 0 dB, and the shutter speed is $\frac{1}{500}$ seconds. Here, the amount of exposure to the CCD 103 is increased by fixing the aperture 101 and reducing the shutter speed, in order to reduce the influence of degradation in resolution or the like due to intermediate diffraction by an ND filter attached to the aperture 101.

Then, if the shutter speed is reduced to $\frac{1}{60}$ seconds, the aperture 101 is opened from F4.0 to F1.8 while fixing the shutter speed at $\frac{1}{60}$ seconds and the gain at 0 dB, as shown in the range C in FIG. 3. If the subject gets even darker, the gain is increased from 0 dB to 20 dB as shown in the range D in FIG. 3.

As described above with reference to FIG. 3, the DVC 10 controls the aperture, the shutter speed, and the gain in accordance with the luminance value calculated within the image processing IC 106 and the program diagram so that an appropriate exposure value is obtained for the subject. Then, when the recording start button of the operation unit 110 is pressed, the DVC 10 records video data at a frame rate of 60 fps in the recording unit 107.

First Embodiment

As described previously, when the image-capturing frame rate changes from "Normal" to "High Speed", video may be darkened as a result of the shortened exposure time. In the case where a drop in luminance is compensated for by opening the aperture 101, a certain amount of time is required to obtain video with appropriate luminance because the aperture 101 requires a certain amount of time to be changed to the target state. In view of this, in a first embodiment, the DVC 10 suppresses degradation in image quality when changing the image-capturing frame rate of video by modifying part of the program diagram as indicated by the dashed dotted line in FIG. 3.

In the first embodiment, the normal frame rate is assumed to be 60 fps and the high frame rate is assumed to be 240 fps, but the respective frame rates are not limited thereto.

In FIG. 3, the shutter speed (that is, exposure time) at the border between the range E and the range F is $1/240$ seconds, which is shorter than a time (first time) (here, $1/60$ seconds) that corresponds to the reciprocal of the normal frame rate. That is, although the details thereof will be discussed later, the DVC 10 suppresses degradation in image quality when changing image-capturing frame rate of video by limiting the shutter speed to be shorter than $1/60$ seconds, instead of increasing the shutter speed up to $1/60$ seconds at the normal frame rate. Also, degradation in image quality when changing the image-capturing frame rate can be particularly effectively suppressed by further limiting the shutter speed to be equal to a time (second time) (here, $1/240$ seconds) that corresponds to the reciprocal of the high frame rate or to be shorter than that time (shorter than the second time) as shown in FIG. 3.

Incidentally, examples of the time when the image-capturing frame rate changes from "Normal" to "High Speed" include the time when video recording in the high-speed recording mode is started from a standby state and the time when the high-speed recording start button is pressed while video is being recorded in the normal recording mode. In the standby state, although video recording is not performed, the DVC 10 captures images at the same frame rate as recording in the normal recording mode, in order to realize EVF display in the display unit 108. Therefore, there is no difference, in terms of capturing video at the normal frame rate, between the standby state and the state in which video is being recorded in the normal recording mode. The two cases are also the same in that the image-capturing frame rate changes from "Normal" to "High Speed" upon the press of the high-speed recording start button. Thus, these two timings are not particularly distinguished in the following description.

The following is a detailed description of the first embodiment. The DVC 10 is capable of switching the high-speed recording mode between "enabled" and "disabled" in accordance with a user instruction via the operation unit 110. When the high-speed recording mode is set disabled, image capturing at the high frame rate is not performed even if the high-speed recording start button is pressed. Thus, in this case, there is no possibility that the image-capturing frame rate will change from "Normal" to "High Speed", and therefore the DVC 10 performs exposure control in accordance with the program diagram indicated by the solid line in FIG. 3. On the other hand, if the high-speed recording mode is set enabled, the DVC 10 performs exposure control by changing a part of the range B and the range C in the program diagram indicated by the solid line in FIG. 3 into those as indicated by the dashed dotted line.

Specifically, since the high frame rate is 240 fps, the maximum exposure time is limited to $1/240$ seconds. As shown in the range E in FIG. 3, the shutter speed is reduced from $1/500$ seconds to $1/240$ seconds as the subject gets darker. If the subject gets even darker, the aperture 101 is opened from F4.0 to F1.8 while maintaining the shutter speed at $1/240$ seconds as shown in the range F. If the subject gets even darker, the gain is increased while fixing the shutter speed and the F number as shown in the range G.

Figure 4:
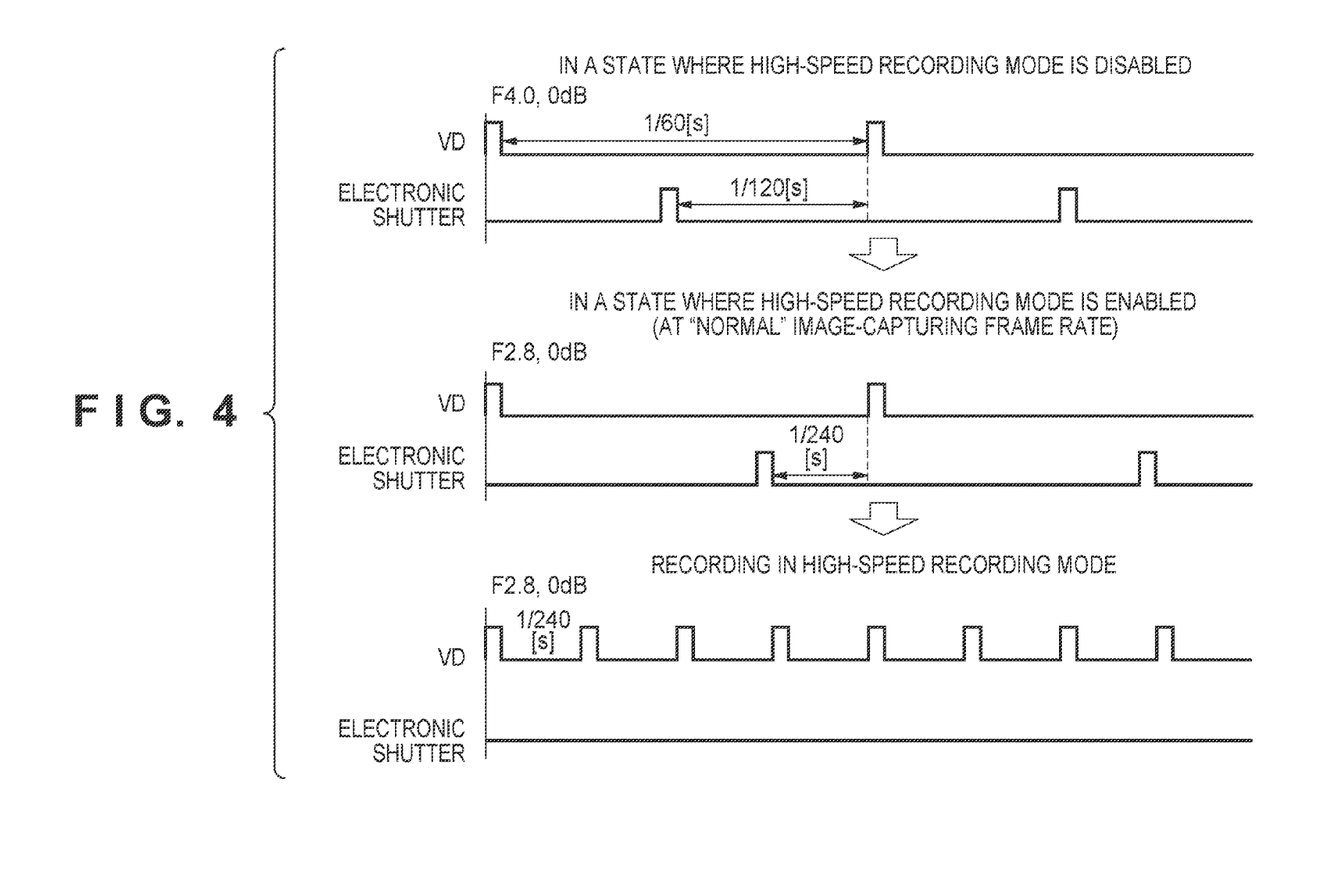
FIG. 4 is a timing chart of the vertical synchronization signal and the electronic shutter pulse in cases where a high-speed recording mode is disabled, where the high-speed recording mode is enabled but image capturing is being performed at a normal frame rate, and where recording is being performed in the high-speed recording mode.

FIG. 4 shows a timing chart of the vertical synchronization signal and the electronic shutter pulse in cases where the high-speed recording mode is disabled, where the high-speed recording mode is enabled but image capturing is being performed at the normal frame rate, and where recording is performed in the high-speed recording mode.

In the case where the high-speed recording mode is disabled, the shutter speed, the F number, and the gain are respectively assumed to be $1/120$ seconds, F4.0, and 0 dB as shown in the upper level in FIG. 4. Here, if the high-speed recording mode is switched to enabled, the shutter speed is changed to $1/240$ seconds as shown in the middle level in FIG. 4. If the brightness of the subject is unchanged, the luminance level within the image processing IC 106 drops because the exposure time changes from $1/120$ seconds to $1/240$ seconds. Therefore, the aperture 101 is opened from F4.0 to F2.8 in accordance with the program diagram indicated by the dashed dotted line (range F) in FIG. 3. This enables the luminance to be maintained at a predetermined level even if the shutter speed is reduced. Note that, in the middle level in FIG. 4, the image-capturing frame rate remains "Normal" (here, 60 fps) and therefore video is displayed at 60 fps in the display unit 108 in accordance with that image-capturing frame rate.

If the high-speed recording start button is pressed in the state shown in the middle level in FIG. 4, the rate of readout from the CCD 103 (image-capturing frame rate) is changed to 240 fps as shown in the lower level in FIG. 4. Here, the shutter speed does not need to be changed because it has been $1/240$ seconds since before the image-capturing frame rate was changed to 240 fps (the output of the electronic shutter pulse is stopped because the shutter speed matches the reciprocal of the frame rate). Accordingly, the luminance of image signals obtained from the CCD 103 will not change without changing the F number and the gain. This prevents the occurrence of a temporary drop in luminance that accompanies a change in the aperture 101, an increase in noise that accompanies an increase in gain, and the like. Furthermore, during recording in the high-speed recording mode, 60 frame images selected by thinning-out from among 240 frames per second are displayed at 60 fps in the display unit 108.

Note that, in the state shown in the middle level in FIG. 4, the shutter speed may be longer than $1/240$ seconds as long as it is shorter by even a small amount than $1/60$ seconds. In this case, the F number or the gain may have to be changed at the time when the image-capturing frame rate changes from "Normal" to "High Speed". However, even in such a case, degradation in image quality can be suppressed better than in the case where the shutter speed prior to the switching of the image-capturing frame rate is ⅟₆₀ seconds.

As described above, according to the present embodiment, in the case where the high-speed recording mode is set "enabled", the DVC 10 limits the exposure time even when operating at the normal frame rate. Specifically, the DVC 10 performs exposure control within a range in which the exposure time is shorter than the time (maximum exposure time) that is the reciprocal of the normal frame rate. This enables suppression of degradation in image quality when changing the image-capturing frame rate of video.

Second Embodiment

A second embodiment first describes a configuration for suppressing an increase in gain during image capturing performed at the normal frame rate, and then describes a configuration for frame-cyclic noise reduction. In the second embodiment, the basic configuration of the DVC 10 is similar to that of the first embodiment (see FIG. 1), but the program diagram shown in FIG. 3 is modified into the one shown in FIG. 5. In the second embodiment as well, the normal frame rate is assumed to be 60 fps and the high frame rate is assumed to be 240 fps.

Figure 5:
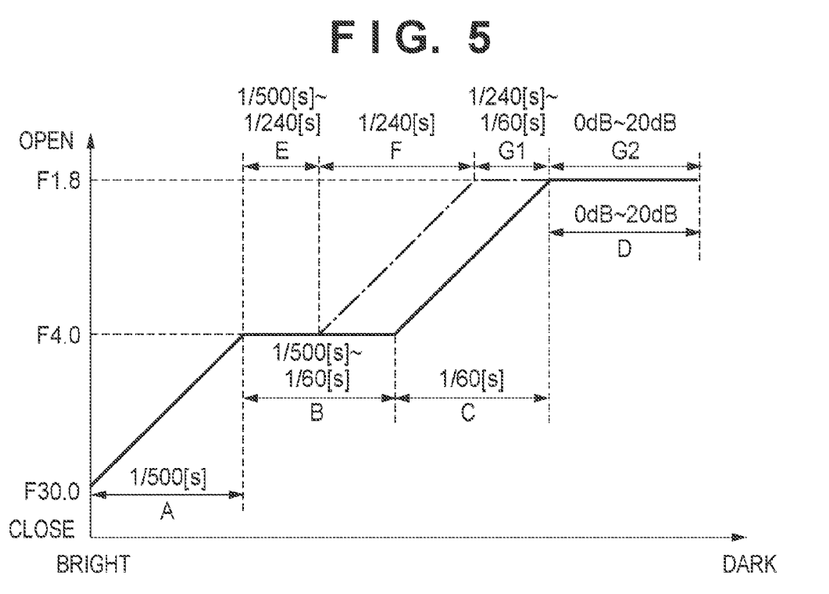
FIG. 5 is a diagram illustrating general exposure control, and exposure control according to a second embodiment.

A comparison of FIG. 3 and FIG. 5 shows the difference therebetween in that the range G in FIG. 3 is divided into ranges G1 and G2 in FIG. 5. In the range G1, the shutter speed is reduced from ⅟₂₄₀ seconds to ⅟₆₀ seconds as the subject gets darker. The F number and the gain do not change during this time. If the subject gets even darker, the gain is increased while fixing the shutter speed and the F number as shown in the range G2.

Moreover, in the case where the brightness of a subject corresponds to the range G1 and the range G2, the CPU 109 calculates a correction gain during the high-speed recording mode, based on the current exposure time and the frame rate during the high-speed recording mode.

For example, consider the case where the frame rate during the high-speed recording mode is 240 fps and current exposure control (at the normal frame rate) is performed in a state in which the F number is 1.8, the exposure time is ⅟₆₀ seconds, and the gain is x dB. In this case, the correction gain is 12 dB since 240÷60=four times=12 dB. Then, when the image-capturing frame rate changes from "Normal" to "High Speed", the CPU 109 performs exposure control by adding 12 dB to the pre-change gain (that is, x dB).

In the range G1 and the range G2, in the case where the exposure time is shorter than or equal to ⅟₂₄₀ seconds (shorter than or equal to a maximum exposure time corresponding to the high frame rate), the luminance of image data cannot be kept at a predetermined level even if the aperture 101 is opened to the maximum. In these ranges, if the exposure time is limited to be shorter than or equal to ⅟₂₄₀ seconds during image capturing performed at the normal frame rate, noise will increase because amplification is performed with a predetermined gain as shown in the range G in FIG. 3. In contrast, in the second embodiment, the gain is not increased in the range G1 in FIG. 5. In the range G2 as well, an increase in gain is suppressed. Accordingly, it is possible to suppress an increase in noise in image data during image capturing performed at the normal frame rate, by allowing the exposure time to be longer than ⅟₂₄₀ seconds as long as it is shorter than or equal to ⅟₆₀ seconds (shorter than or equal to the first time).

Next is a description of the configuration for frame-cyclic noise reduction (hereinafter referred to as "NR processing"). The NR processing is expressed by the following formula:

$$Y_n = (1-K)X_n + K*Y_{n-1},$$

where $Y_n$ is an image obtained by the NR processing (image to be recorded/displayed), $Y_{n-1}$ is an image of one frame previous to the image to which the NR processing has been applied, $X_n$ is an image before the NR processing is applied, and K is a cyclic coefficient.

As expressed by the above formula, in the NR processing, the larger the cyclic coefficient K, the greater the dependency on the past image and the larger the image lag, but the more random noise is reduced because a larger number of frame images are used for averaging. On the other hand, the smaller the cyclic coefficient K, the greater the dependency on the current image and the smaller the image lag, but the more random noise occurs. In view of this, the DVC 10 according to the present embodiment reduces random noise by increasing the cyclic coefficient K in accordance with the gain.

Figure 6:
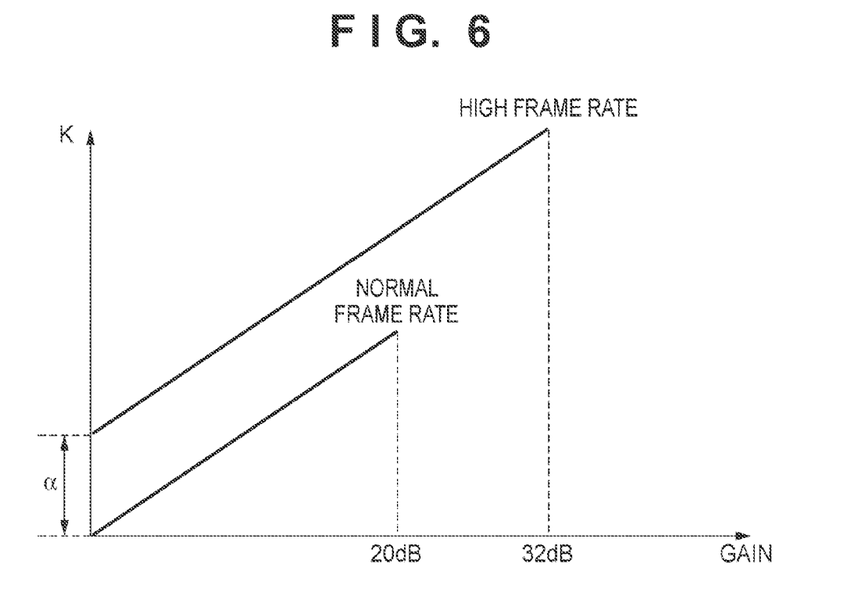
FIG. 6 shows a graph representing changes in a cyclic coefficient K according to the second embodiment.

FIG. 6 shows a graph representing changes in the cyclic coefficient K according to the second embodiment. In FIG. 6, the horizontal axis indicates the gain, and the vertical axis indicates the cyclic coefficient K. As shown in FIG. 6, in the case of image capturing using the normal frame rate, the DVC 10 suppresses random noise by increasing the cyclic coefficient K with increasing gain and setting the cyclic coefficient K to a maximum value at a maximum gain of 20 dB. Also, in the case of image capturing using the high frame rate, the DVC 10 suppresses random noise by increasing the cyclic coefficient K to be higher by a than in the case of using the normal frame rate and setting the cyclic coefficient K to a maximum value at a maximum gain of 32 dB.

In the present embodiment, the maximum gain is 20 dB+12 dB=32 dB since the high frame rate is 240 fps and 240÷60=four times=12 dB. Also, in the case of image capturing using the high frame rate, the correlativity of frame images is higher than in the case of image capturing using the normal frame rate (that is, a subject motion is smaller) because the rate of readout from the CCD 103 is high. Accordingly, the image lag is less likely to occur even if the cyclic coefficient K is increased as compared with the case of using the normal frame rate, and therefore it is possible to highly suppress random noise.

Note that the above value a is a value obtained by, for example, experiment or the like, and specifically, a value at which the image lag level will be equivalent to that in the case of using the normal frame rate. The value a can be increased with an increase in the frame rate. Furthermore, in order to improve the image lag, the above NR processing may be performed such that the luminance values of pixels are compared between frames, and if the difference is at or above a certain level, the above NR processing is not to be applied.

As described above, according to the present embodiment, an increase in gain during image capturing performed at the normal frame rate can be suppressed by modifying a part of the program diagram as shown in the ranges G1 and G2 in FIG. 5. It is also possible to effectively reduce noise by setting the cyclic coefficient for frame-cyclic noise reduction as shown in FIG. 6.

Third Embodiment

In the first and second embodiments, the DVC 10 suppresses degradation in image quality when changing the image-capturing frame rate by, in principle, limiting the exposure time since before the image-capturing frame rate changes to "High Speed". In contrast, in a third embodiment, the DVC 10 suppresses degradation in image quality by taking measures at the time when the image-capturing frame rate changes from "Normal" to "High Speed". In the third embodiment, the basic configuration of the DVC 10 is similar to that of the first embodiment (see FIG. 1), but the program diagram to be used is the portion indicated by the solid line in FIG. 3, rather than the portion indicated by the dashed dotted line. In the third embodiment as well, the normal frame rate is assumed to be 60 fps and the high frame rate is assumed to be 240 fps.

As described previously, examples of the time when the image-capturing frame rate changes from "Normal" to "High Speed" include the time when video recording in the high-speed recording mode is started from a standby state and the time when the high-speed recording start button is pressed during video recording in the normal recording mode. Hereinafter, processing executed at such times by the DVC 10 will be described.

Upon receiving an instruction to switch the image-capturing frame rate (switching instruction), the CPU 109 detects the exposure time at that point in time. If the exposure time is shorter than or equal to 1/240 seconds (that is, shorter than or equal to the maximum exposure time at the high frame rate), the CPU 109 promptly changes the image-capturing frame rate from 60 fps to 240 fps by changing the interval between VD signals to 1/240 seconds, starting from the next frame.

Figure 7:
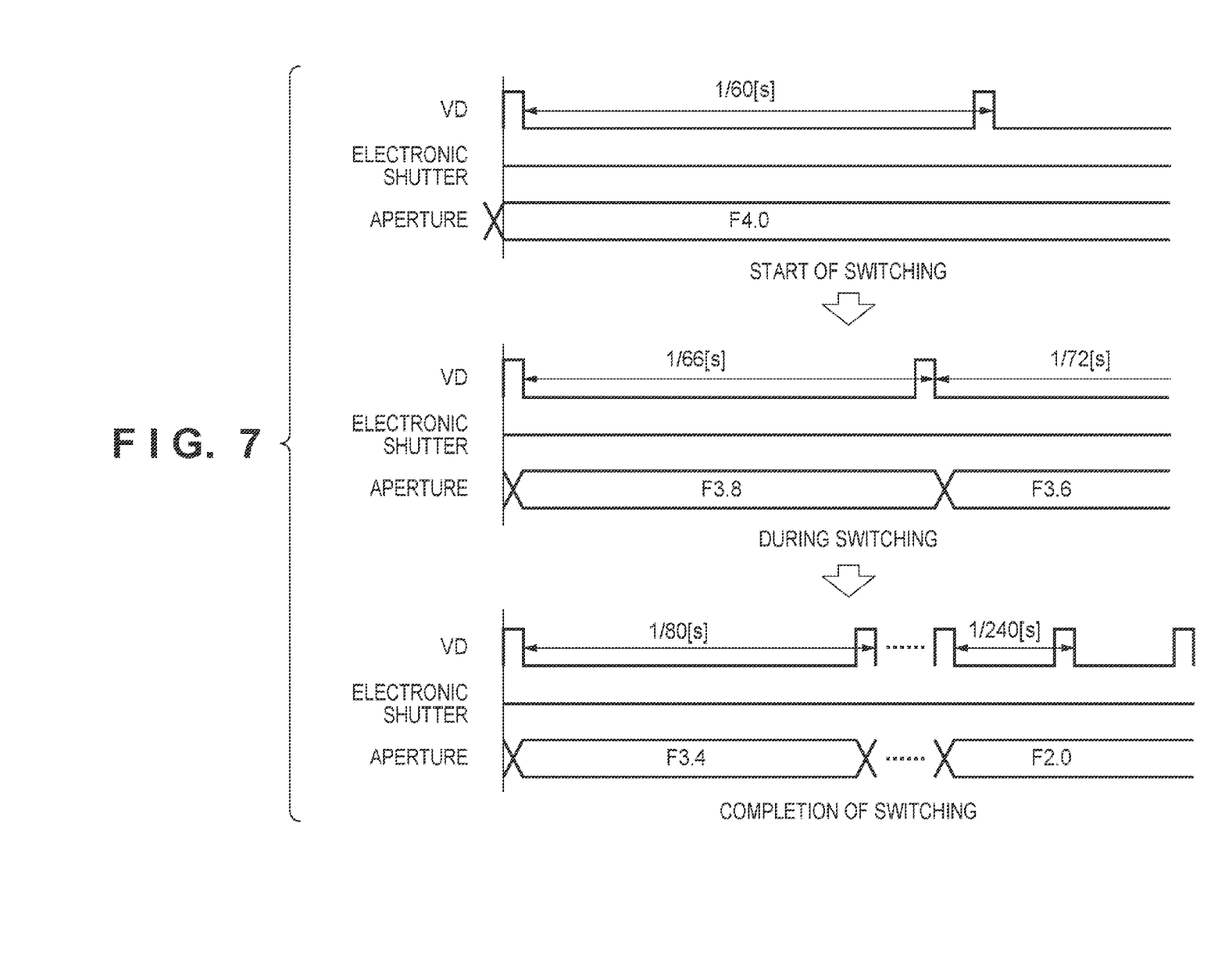
FIG. 7 is a timing chart illustrating processing for changing the image-capturing frame rate according to a third embodiment.

Next, the case where the switching instruction is received when the exposure time is longer than 1/240 seconds will be described. FIG. 7 is a timing chart illustrating processing for changing the image-capturing frame rate according to the third embodiment. As shown in the upper level in FIG. 7, it is assumed that the CPU 109 has received the switching instruction in a state in which the F number is 4.0 and the exposure time is 1/60 seconds (the electronic shutter pulse is not output). In this case, as shown in the middle to lower levels in FIG. 7, the CPU 109 performs control in which the aperture 101 is opened so as to reduce the F number. The control of opening the aperture 101 is executed so as to compensate for a drop in the luminance of image data as a result of the shortened exposure time that accompanies a change in the image-capturing frame rate. While the aperture 101 is being gradually opened, the CPU 109 also shortens the interval between VD signals gradually (by approximately 10%), such as from 1/60 seconds to 1/66 seconds, then to 1/72 seconds, then to 1/80 seconds, . . . , and then to 1/240 seconds. In other words, the CPU 109 gradually changes the image-capturing frame rate from "Normal" to "High Speed". This suppresses the occurrence of a situation in which video is temporarily darkened and image quality is degraded during the period before the aperture 101 has completely changed, thus suppressing degradation in image quality when changing the image-capturing frame rate.

Figure 8:
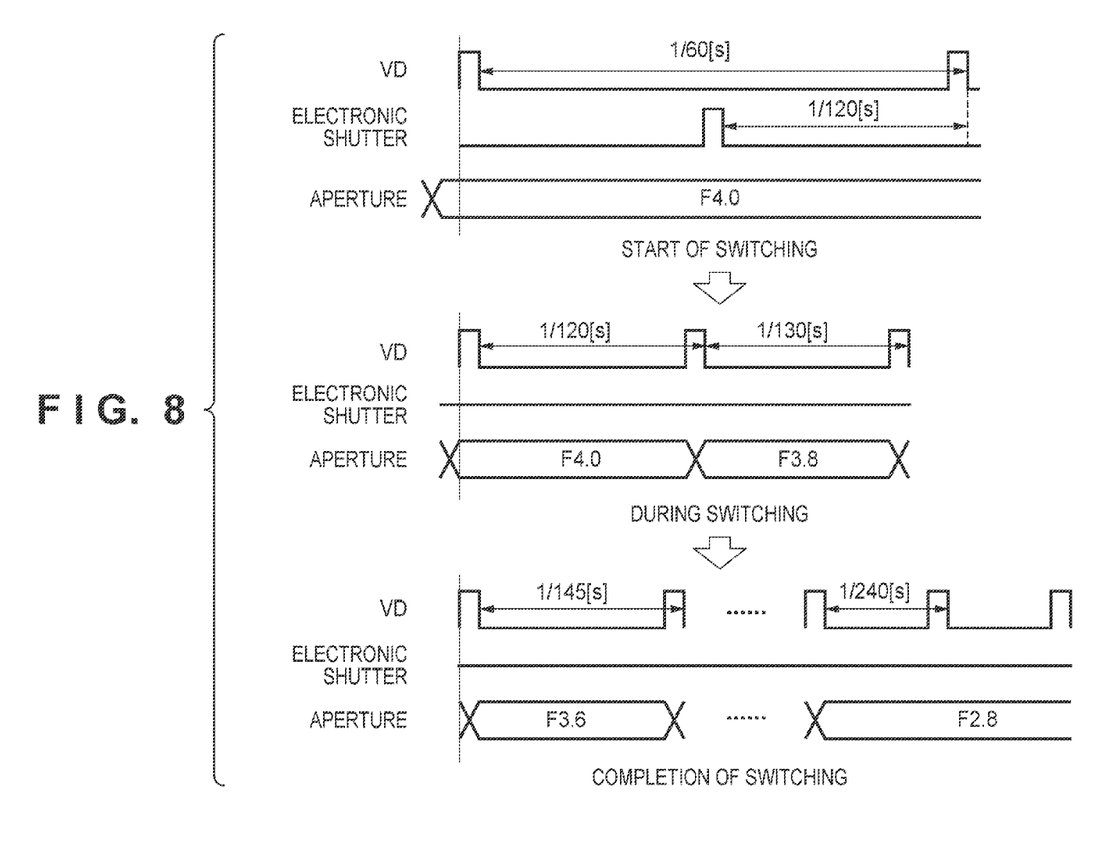
FIG. 8 is a timing chart illustrating the processing for changing the image-capturing frame rate according to a third embodiment, in the case where the exposure time is longer than a maximum exposure time corresponding to the changed image-capturing frame rate and is shorter than a maximum exposure time corresponding to the pre-change image-capturing frame rate.

Incidentally, in the case where the exposure time before the switching instruction is received is longer than 1/240 seconds and shorter than 1/60 seconds, the CPU 109 may perform additional control as shown in FIG. 8. As shown in the upper level in FIG. 8, it is assumed that the CPU 109 has received the switching instruction in a state in which the F number is 4.0 and the exposure time is 1/120 seconds. In this case, as shown in the middle level in FIG. 8, the CPU 109 promptly changes the image-capturing frame rate to a frame rate (that is, 120 fps) at which the exposure time at that point in time is the maximum exposure time. Thereafter, as in the case of FIG. 7, the CPU 109 gradually changes the image-capturing frame rate up to 240 fps while performing control in which the aperture 101 is being opened (see the lower level in FIG. 8). This speeds up the process of changing the image-capturing frame rate.

Alternatively, for example in the case where a subject is dark as in the range D in FIG. 3 and the image-capturing frame rate does not reach 240 fps ("High Speed") in a state in which a predetermined luminance level is maintained even if the aperture 101 has been opened to the maximum, the CPU 109 may perform the following control.

First, the CPU 109 acquires a gain α [dB] before the start of changing the image-capturing frame rate, and calculates a correction gain x (x=20 log(240/60) dB=12 dB), based on the high frame rate of 240 fps and the exposure time of 1/60 seconds. Then, upon receiving the switching instruction, the CPU 109 promptly changes the image-capturing frame rate to "High Speed" and amplifies the image data by changing the gain to α+x dB. For example, if α=4 dB, the gain is changed to 16 dB.

Furthermore, the CPU 109 may also perform similar processing to that performed on the range D, on a region of the range C in FIG. 3 that overlaps with the range G. In this case, there is still some room for the aperture 101 to be slightly opened, so the correction gain value will be reduced by an amount corresponding to that aperture opening. Furthermore, the CPU 109 may gradually change the image-capturing frame rate during control of the opening of the aperture 101.

Furthermore, if the luminance of the subject itself has changed, the CPU 109 performs exposure control in accordance with that change in luminance even during the process of performing the aforementioned exposure control.

As described above, the DVC 10 according to the present embodiment, in principle, gradually changes the image-capturing frame rate. This suppresses the occurrence of a situation in which video is temporarily darkened and image quality is degraded during the period before the aperture 101 has completely changed, thus suppressing degradation in image quality when changing the image-capturing frame rate.

Fourth Embodiment

In a fourth embodiment, the DVC 10 changes the details of processing for changing the image-capturing frame rate, in accordance with a motion of a subject when an instruction to switch the image-capturing frame rate has been received. In the fourth embodiment, the basic configuration of the DVC 10 is similar to that of the third embodiment. Note that the image processing IC 106 is configured to be capable of detecting a motion of a subject. In the fourth embodiment as well, the normal frame rate is assumed to be 60 fps and the high frame rate is assumed to be 240 fps.

Figure 9:
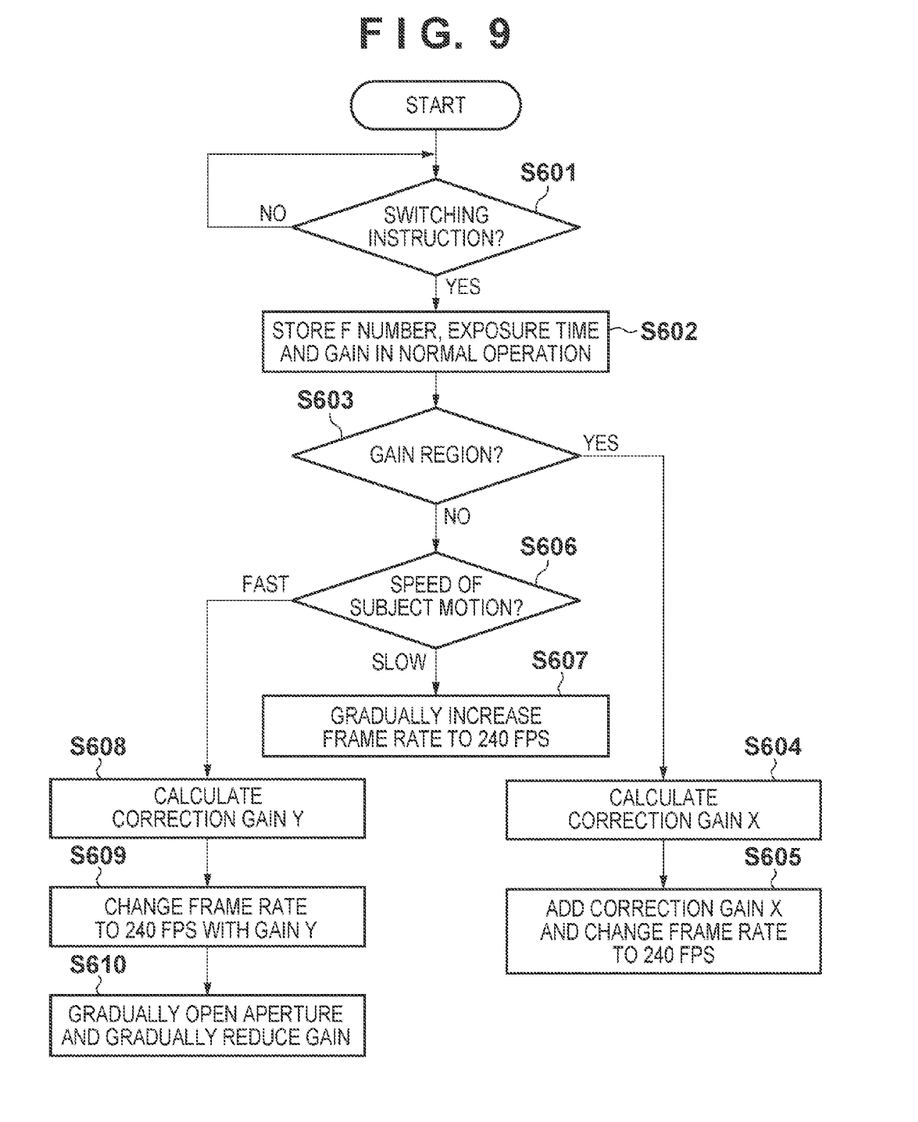
FIG. 9 is a flowchart showing the flow of processing for changing the image-capturing frame rate according to a fourth embodiment.

FIG. 9 is a flowchart showing the procedure of processing for changing the image-capturing frame rate according to the fourth embodiment.

In step S601, the CPU 109 determines whether or not an instruction to switch the image-capturing frame rate has been received via the operation unit 110. Upon receipt of the switching instruction, the processing proceeds to step S602. In step S602, the CPU 109 stores the F number, the exposure time, and the gain at the time when the switching instruction has been received. In step S603, the CPU 109 determines whether or not the exposure condition corresponds to a gain region. The term "gain region" as used herein refers to a region corresponding to the range D in FIG. 3. Alternatively, a region that overlaps with the range G, out of the range C in FIG. 3, may also be included in the gain region. If the exposure condition corresponds to the gain region, the processing proceeds to step S604. The processing performed in step S604 and step S605 is the same as that described in the third embodiment. If the exposure condition does not correspond to the gain region, the processing proceeds to step S606.

In step S606, the image processing IC 106 calculates a motion amount M by obtaining a difference in luminance level at corresponding pixels between frames based on the image signals read out from the CCD 103 and further performing weighing. The motion amount M represents the degree of motion of a subject. The greater the motion amount M, the larger the motion of the subject. Also, a coefficient of the weighing performed in calculating the motion amount M may, for example, be increased for a subject area recognized by subject recognition. Also, different coefficient values may be used depending on whether it is the central portion of an image area or the peripheral portion thereof, for example. Furthermore, the motion amount M may be calculated by taking into consideration a motion amount of motion vectors of a subject that can be recognized, or may be calculated by taking into consideration variations in the angle of view of a cutout region, such as camera shake correction. After the motion amount M has been calculated, the CPU 109 determines whether the motion of the subject is fast (larger than a predetermined degree) or slow. The "predetermined degree" is determined by comparing the actual motion of the subject and the calculation result obtained by subjecting the actual motion of the subject to an algorithm for detecting the above-described motion-amount. The "predetermined degree" may also be changed according to image capturing conditions such as the exposure amount, the frame rate, and zoom-focusing.

If the motion of the subject is slow, the processing proceeds to step S607. The processing performed in step S607 is the same as that described in the third embodiment. In this way, if the motion of the subject is slow, the CPU 109 takes some amount of time to change the image-capturing frame rate so as to avoid a change in luminance.

If the motion of the subject is fast, the processing proceeds to step S608. Before describing step S608, the content stored in step S602 is assumed such that the F number is 4.0, the exposure time is $1/120$ seconds, and the gain 0 dB. In step S608, the CPU 109 calculates a correction gain y for compensating for a drop in luminance that accompanies the shortened exposure time as a result of changing the image-capturing frame rate to 240 fps. The correction gain y will be y=240/120=twice=6 dB.

In step S609, the CPU 109 promptly changes the frame rate to 240 fps and amplifies the image data by increasing the gain by 6 dB. In step S610, the CPU 109 performs control in which the aperture 101 is opened. The CPU 109 also gradually reduces the gain for amplifying the image data, in response to an increase in the luminance of the image data that accompanies the gradual opening of the aperture 101. For example, if the aperture 101 is opened such that the exposure amount is increased by 10% each time, control is performed such that the F number is reduced from F4.0 to F3.8, then to F3.6, . . . , and then to F2.8, the gain is reduced from 6 dB to 5.1 dB, then to 4.2 dB, . . . and then to 0 dB, and the luminance level does not change.

Furthermore, if the luminance of the subject itself has changed, the CPU 109 performs exposure control in accordance with that change in luminance even during the process of performing the aforementioned exposure control.

As described above, in the case where the motion of the subject is fast, the image-capturing frame rate is speedily switched. Even in such a case, since the gain decreases gradually as described in relation to step S610, the occurrence of noise is limited as well.

Alternatively, even during the processing in step S607, the CPU 109 may regularly acquire the motion amount M of the subject via the image processing IC 106, and if the motion amount M is determined to be large, the CPU 109 may transition the processing to step S608.

As described above, the DVC 10 according to the present embodiment changes the details of the processing for changing the image-capturing frame rate in accordance with a motion of a subject when an instruction to switch the image-capturing frame rate has been received. In particular, in the case where the motion of the subject is fast, the DVC 10 speedily switches the image-capturing frame rate.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-035175, filed on Feb. 21, 2011 which is hereby incorporated by reference herein in its entirety.

What is claimed is:

1. An image capturing apparatus, comprising:
an optical system including an aperture;
a first driving unit configured to drive the optical system;
an image sensor configured to generate an image signal by photoelectric conversion of light incident from the optical system;
a second driving unit configured to drive the image sensor;
a detecting unit configured to detect a luminance level of the image signal;
a first setting unit configured to set a first mode in which motion images are not recorded or a second mode in which motion images are recorded; and
a control unit configured to control the second driving unit to read out an image signal from the image sensor at a first frame rate in a case where the first setting unit sets the first mode or at a second frame rate higher than the first frame rate in a case where the first setting unit sets the second mode,
wherein, in a case where the first setting unit sets the first mode, the control unit controls the second driving unit to drive the image sensor so that an exposure time of the image sensor is shorter than or equal to a time corresponding to a reciprocal of the second frame rate, and controls the first driving unit to drive the aperture so that the luminance level detected by the detecting unit is at a predetermined level.

2. The image capturing apparatus according to claim 1, further comprising:
a second setting unit configured to set switching of the frame rate from the first frame rate to the second frame rate to "enabled" or "disabled",
wherein in a case where the switching is set "enabled", the control unit performs the control within a range in which the exposure time is shorter than a time corresponding to a reciprocal of the first frame rate.

3. The image capturing apparatus according to claim 1, further comprising:

an amplification unit configured to amplify the image signal, wherein in a case where the second driving unit drives the image sensor at the first frame rate, if the luminance level of the image signal is lower than the predetermined level in a state in which the exposure time is shorter than or equal to the time corresponding to the reciprocal of the second frame rate even though the aperture is opened to a maximum, the control unit performs the control within a range in which the exposure time is shorter than or equal to a time corresponding to a reciprocal of the first frame rate, and in a case where the frame rate is switched to the second frame rate, the control unit changes the exposure time to the time corresponding to the reciprocal of the second frame rate and controls the amplification unit to amplify the image signal so as to compensate for a drop in luminance level that accompanies the change in the exposure time.

4. The image capturing apparatus according to claim 1, further comprising:

a frame-cyclic noise reduction unit configured to reduce noise in the image signal, wherein in a case where the second driving unit drives the image sensor at the second frame rate, the noise reduction unit reduces noise using a cyclic coefficient higher than a cyclic coefficient for a case of the first frame rate.

5. The image capturing apparatus according to claim 1, further comprising:

a reception unit configured to receive a switching instruction to switch the frame rate from the first frame rate to the second frame rate, wherein in a case where the switching instruction is received in a case where the exposure time is longer than a maximum exposure time corresponding to the second frame rate, the control unit controls the first driving unit to open the aperture so as to compensate for a drop in the luminance of the image signal as a result of shortening the exposure time to the maximum exposure time corresponding to the second frame rate, and also performs control for switching the frame rate from the first frame rate to the second frame rate, and in the switching control, the control unit gradually changes the frame rate from the first frame rate to the second frame rate while the aperture is being gradually opened by the first driving unit.

6. The image capturing apparatus according to claim 5, wherein, in the switching control, the control unit changes the frame rate promptly to a frame rate at which an exposure time at a time of reception of the switching instruction is a maximum exposure time, and then gradually to the second frame rate.

7. The image capturing apparatus according to claim 5, further comprising:

a motion detection unit configured to detect a motion of a subject included in the image signal, wherein, in the switching control, if a degree of the detected motion is larger than a predetermined degree, the control unit promptly changes the frame rate from the first frame rate to the second frame rate, and amplifies the image signal so as to compensate for a drop in luminance level that accompanies the change in the frame rate.

8. The image capturing apparatus according to claim 7, wherein after the amplification has been started and while the aperture is being gradually opened by the first driving unit, the control unit gradually reduces a degree of the amplification of the amplification unit in accordance with an increase in the luminance of the image signal that accompanies the opening of the aperture.

9. The image capturing apparatus according to claim 5, wherein in the switching control, if the frame rate does not reach the second frame rate even after the aperture has been opened to a maximum, the control unit promptly changes the frame rate to the second frame rate and amplifies the image signal so as to compensate for a drop in luminance level that accompanies the change in the frame rate.

10. A control method for an image capturing apparatus comprising an optical system including an aperture, a first driving unit configured to drive the optical system, an image sensor configured to generate an image signal by photoelectric conversion of light incident from the optical system, and a second driving unit configured to drive the image sensor, the control method comprising:

a detecting step of detecting a luminance level of the image signal;

a first setting step of setting a first mode in which motion images are not recorded or a second mode in which motion images are recorded; and a control step of controlling the second driving unit to read out an image signal from the image sensor at a first frame rate in a case where the first setting step sets the first mode or at a second frame rate higher than the first frame rate in a case where the first setting step sets the second mode, wherein, in a case where the first frame rate the first setting step sets the first mode, the control step controls the second driving unit to drive the image sensor so that an exposure time of the image sensor is shorter than or equal to a time corresponding to a reciprocal of the second frame rate, and controls the first driving unit to drive the aperture so that the luminance level detected in the detecting step is at a predetermined level.

11. The control method according to claim 10, further comprising:

a reception step of receiving a switching instruction to switch the frame rate from the first frame rate to the second frame rate, wherein in a case where the switching instruction is received in a case where the exposure time is longer than a maximum exposure time corresponding to the second frame rate, in the control step, the first driving unit is controlled to open the aperture so as to compensate for a drop in the luminance of the image signal as a result of shortening the exposure time to the maximum exposure time corresponding to the second frame rate, and control is also performed for switching the frame rate from the first frame rate to the second frame rate, and in the switching control, the frame rate is gradually changed from the first frame rate to the second frame rate while the aperture is being gradually opened by the first driving unit.

12. A non-transitory computer-readable storage medium that stores a program for causing a computer to execute the method according to claim 10.

* * * * *